Dec. 16, 1941.　　　D. E. BATCHELDER　　　2,265,978
ALTERNATING CURRENT ELECTROLOGGING OF WELL BORES
Filed Oct. 4, 1939
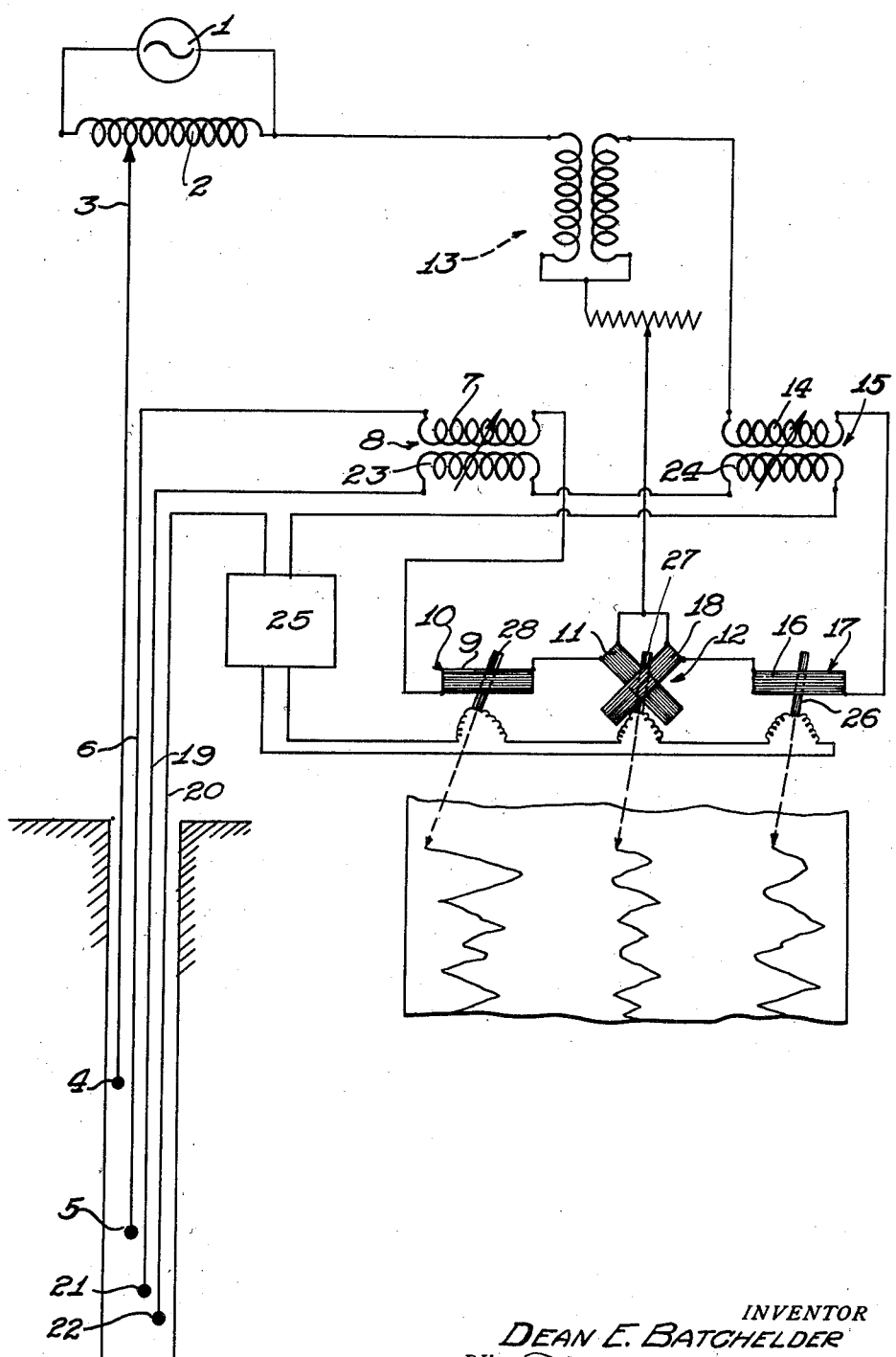
INVENTOR
DEAN E. BATCHELDER
BY Lloyd Spencer
ATTORNEY Patented Dec. 16, 1941

2,265,978

UNITED STATES PATENT OFFICE 2,265,978

ALTERNATING CURRENT ELECTRO-LOGGING OF WELL BORES

Dean E. Batchelder, Los Angeles, Calif., assignor to Lane-Wells Company, Los Angeles, Calif., a corporation of Delaware Application October 4, 1939, Serial No. 297,860

6 Claims. (Cl. 175—182)

My invention relates to alternating current electrologging of oil wells, that is, to a method and apparatus designed to determine electrically the characteristics of the formation traversed by a well bore. Among the objects of my invention are:

First, to provide a method and apparatus which is particularly designed to measure the quadrature components of an alternating current field generated within a well bore whereby the resistance and reactance encountered by the alternating current field may be separately recorded;

Second, to provide a method and apparatus of this character which eliminates the need of an alternating current potentiometer or other additional means for compensating balancing or measuring the quadrature components and, in particular, eliminates the need of commutators or other mechanical devices heretofore required in order to separate the quadrature components;

Third, to provide a method and apparatus of this character whereby a graphic record of the phase angle or power factor of the formation encountered may be obtained;

Fourth, to provide a method and apparatus of this character whereby a single pair of probe electrodes, in association with the usual input electrodes, are sufficient for the production of three graphic records, namely, an in phase or resistance record, a ninety-degree out of phase or reactance record, and a phase angle record, these records serving individually and by comparison with each other to indicate the character of formation encountered;

Fifth, to provide a method and apparatus of this character which is capable of operation with any of the electrode combinations commonly employed in electrologging, that is, either the four-electrode system in which both the input and probe electrodes are lowered and the two and three-electrode systems in which one or more of the electrodes are grounded at the surface or to the well casing; and Sixth, to provide a method and apparatus of this character which may be operated in conjunction with (and, in fact, simultaneously with, if desired) other systems of electrologging such as the systems designed for measurement of spontaneous or natural potential and direct current measurements.

With the above and other objects in view, as may appear hereinafter, reference is directed to the accompanying drawing, in which the figure is a wiring diagram of an apparatus illustrating my method and embodying my invention.

With reference to the wiring diagram, an alternating current source 1, with means for regulating the current indicated by 2, sends current through lead 3 forming one conductor of a multiple conductor cable and terminating in an input electrode 4. The circuit is completed through a second current electrode 5 and conductor 6, also constituting one of the leads of the multiple conductor cable, and continues successively through the primary coil 7 of a variocoupler 8, the field coil 9 of galvanometer 10 and one of the field coils 11 of a dual field coil dynamometer 12, to a phase-splitting means 13 and back to the source of alternating current 1.

The phase-splitting means is connected to a primary coil 14 of a second variocoupler 15. The primary coil 14 is connected in series with a field coil 16 of a galvanometer 17 and the second field coil 18 of the dynamometer 12, the circuit returning to the phase-splitting means 13.

The conductor cable contains two additional leads 19 and 20 which are provided at their lower ends with probe electrodes 21 and 22. One conductor is connected in series with the secondary coils 23 and 24 of the variocouplers 8 and 15, respectively, while the other lead or conductor is connected to an amplifier 25 in series with moving coils 26, 27 and 28 of the dynamometers 17, 12 and 10, respectively.

The moving coil 27 is so mounted as to provide a minimum of friction or restraint in turning, that is, the moving coil is as free as possible to assume its normal position with respect to the field established by its initial coil. Moving coils 26 and 28 have the usual electrical instrument or meter springs. In order to record movement of the moving coils, mirrors may be provided for the reflection of light beams, and other suitable devices well known in the art may be employed. Movement of such coils is preferably recorded on a paper strip or film driven in synchronism with the movement of the cable into the well so that the fluctuations of the coils may be plotted with respect to the depth of their electrodes.

Operation of the circuit hereinbefore described is as follows: The probe electrodes 21 and 22 sample the field established by the electrodes 4 and 5, and by reason of the phase-splitting means 13 the flow of current through the field coil 9 of the dynamometer 10 is in phase with the current flowing through the field coil 28, so that this field coil tends to assume positions of equilibrium dependent upon the potential of the formation in phase with the source of alternating current. This is also true of the field coil 11 of the double coil dynamometer 12. On the other hand, the field coil 16 of the dynamometer 17, as well as the field coil 18 of dynamometer 12, is, by adjustment of the phase-splitting means 13, 90 degrees out of phase with the input current, so that the moving coil 26 of dynamometer 17 tends to indicate the potential of the "imaginary" component or reactance component of the electrical field established by the electrodes 4 and 5.

By reason of the fact that the moving coil 27 of the double coil dynamometer is influenced by field coils 11 and 18, which are 90 degrees out of phase with each other, said field coil 27 tends to assume a position which is resultant of the positions assumed by field coils 26 and 28; in other words, assumes positions indicative of the power factor or power factor change caused by the formation in proximity to the electrodes.

It will be noted that it is merely necessary to adjust the phase-splitting means and the variocouplers in order to cause the dynamometers 10 and 17 to indicate the "in phase" and "out of phase" components or quadratures in the field established by electrodes 4 and 5.

The variocouplers serve to neutralize in part the potential between the electrodes. Thus the variocouplers may be adjusted until the indications of the dynamometers are zero or at some predetermined value for a given condition in the well bore and such condition utilized as a reference or base.

While the resulting "curves" produced by the dynamometers 10 and 17 are conventional in the art of alternating current electrologging, the dual dynamometer 12 introduces an entirely new curve which, in conjunction with other measurements made in the course of electrologging, aids materially in interpreting the electrolog charts identifying the formation encountered. While all three curves illustrated are desirable, inasmuch as the comparative effect of a given formation thereon offers more clues to the identity of the formation than does independent consideration of each curve, it is nevertheless possible to omit either the dynamometer 12 or the dynamometers 10 and 17 from the circuit, without affecting the proper operation of those remaining.

Various changes and alternate arrangements may be made within the scope of the appended claims, in which it is my intention to claim all novelty inherent in the invention as broadly as the prior art permits.

I claim:

1. In apparatus for electrical surveying of earth formations: means for creating an electric field in said formation comprising a pair of input electrodes, a source of alternating current and input circuit means connecting said source to said input electrodes, at least one of said input electrodes being movable with respect to said formation; probe circuit means including a probe electrode movable with but in spaced relation to said movable input electrodes, said probe circuit including, in series relation with said probe electrode, dynamometer means for indicating variations in the phase of potential in said probe circuit as said electrodes are moved, and variocoupler means for in part neutralizing potential induced in said probe circuit by the electric field in said formation.

2. In apparatus for electrical surveying of earth formations: means for creating an electric field in said formation comprising a pair of input electrodes, a source of alternating current and input circuit means connecting said source to said input electrodes, at least one of said input electrodes being movable with respect to said formation; probe circuit means including a probe electrode movable with but in spaced relation to said movable input electrode; and dynamometer means connected to said input and probe circuits responsive only to potentials in said probe circuit that are in quadrature to the current in said input circuit.

3. In apparatus for electrical surveying of earth formations: means for creating an electric field in said formation comprising a pair of input electrodes, a source of alternating current and input circuit means connecting said source to said input electrodes, at least one of said input electrodes being movable with respect to said formation; probe circuit means including a probe electrode movable with but in spaced relation to said movable input electrode; first dynamometer means connected to said input and probe circuits responsive only to potentials in said probe circuit that are in quadrature to the current of said input circuit; and second dynamometer means connected to said input and probe circuits responsive only to potentials in said probe circuit that are in phase with the current in said input circuit.

4. A method of determining variations in earth formations penetrated by a drill hole which comprises: lowering a system of electrodes in the drill hole into a predetermined position; passing alternating current between some of said electrodes to thereby create an electric field in the surrounding formation, said field inducing a potential between others of said electrodes; neutralizing said potential in part at least both as to phase and magnitude in said one position of said electrode system; and measuring variations in the potential across said other electrodes while moving said electrode system through the drill hole and maintaining said neutralizing potential constant.

5. An apparatus for electrically investigating formation confronting a well bore, comprising: an input circuit including input electrodes, at least one of which is movable along the well bore, a source of alternating current for supplying said electrodes whereby an alternating current field is established in the formation, a pair of dynamometer primary coils in said input circuit, means for maintaining a phase differential between said coils; a probe circuit including probe electrodes, at least one of which is movable along the well bore, and dynamometer secondary coils associated with said primary coils and responsive to the components of said field, which correspond to the phases of their respective primary coils.

6. An apparatus for electrically investigating formation confronting a well bore, comprising: an input circuit including input electrodes, at least one of which is movable along the well bore, a source of alternating current for supplying said electrodes whereby an alternating current field is established in the formation, a pair of dynamometer primary coils in said input circuit, means for maintaining a phase differential between said coils; a probe circuit including probe electrodes, at least one of which is movable along the well bore; and a dynamometer secondary coil in said probe circuit and inductively responsive to both of said primary coils to indicate the resultant effect of the components of said electrical field corresponding to the phases of said primary coils.

DEAN E. BATCHELDER.